US012508188B2

(12) United States Patent
Costa

(10) Patent No.: US 12,508,188 B2
(45) Date of Patent: Dec. 30, 2025

(54) FASCIA MASSAGER AND ITS METHOD OF MANUFACTURE

(71) Applicant: Vince Costa, Anaheim, CA (US)

(72) Inventor: Vince Costa, Anaheim, CA (US)

( * ) Notice: Subject to any disclaimer, the term of this patent is extended or adjusted under 35 U.S.C. 154(b) by 847 days.

(21) Appl. No.: 17/649,446

(22) Filed: Jan. 31, 2022

(65) Prior Publication Data

US 2022/0241136 A1 Aug. 4, 2022

Related U.S. Application Data

(63) Continuation-in-part of application No. 29/770,782, filed on Feb. 16, 2021, now Pat. No. Des. 956,996.

(60) Provisional application No. 63/144,181, filed on Feb. 1, 2021.

(51) Int. Cl.
*A61H 7/00* (2006.01)

(52) U.S. Cl.
CPC ..... *A61H 7/007* (2013.01); *A61H 2201/1253* (2013.01); *A61H 2201/1635* (2013.01); *A61H 2201/165* (2013.01)

(58) Field of Classification Search
CPC .. A61H 7/002; A61H 7/007; A61H 15/00-02; A61H 2015/0007-0071; A61H 1/006; A61H 1/008; A61H 39/00; A61H 39/04; A61H 2201/0153; A61H 2201/0157
USPC .......................................... D24/214; 601/135
See application file for complete search history.

(56) References Cited

U.S. PATENT DOCUMENTS

| | | | | |
|---|---|---|---|---|
| 4,343,265 A | | 8/1982 | Belschner | |
| 5,103,809 A | | 4/1992 | DeLuca | |
| D384,157 S | | 9/1997 | Kusnets et al. | |
| 5,836,901 A | * | 11/1998 | Shenkal | A61H 7/003 601/134 |
| D403,430 S | * | 12/1998 | Chien | D24/214 |
| D447,809 S | | 9/2001 | Gladieux, III | |
| D556,913 S | | 12/2007 | Laituri | |
| D633,217 S | | 2/2011 | Robertson | |
| 9,320,675 B2 | | 4/2016 | Johnson | |
| 10,322,057 B2 | | 6/2019 | Black | |
| D863,587 S | * | 10/2019 | Yee | D24/214 |
| D1,004,114 S | * | 11/2023 | Black | A61H 7/007 D24/214 |
| 2004/0230147 A1 | * | 11/2004 | Fretterd | A61H 7/003 601/135 |
| 2016/0113834 A1 | * | 4/2016 | Bring | A61H 7/007 601/134 |
| 2017/0333280 A1 | * | 11/2017 | Black | A61H 7/005 |

* cited by examiner

*Primary Examiner* — Paige Kathleen Bugg
(74) *Attorney, Agent, or Firm* — Clement Cheng

(57) ABSTRACT

A fascia massager has a main body which has a rounded a main body top portion and a flat lower portion on a main body bottom. Fingers are formed on the main body along the main body bottom. The fingers protrude downwardly from the main body bottom. The fingers have a conical finger taper. A first hexagonal frame and a second hexagonal frame are formed on the main body. The fingers extend downwardly as fingers having indents between the fingers. The fingers are parallel to each other. The indents are formed on sides of the main body and have a vertical orientation parallel to the fingers.

6 Claims, 7 Drawing Sheets

FASCIA MASSAGER AND ITS METHOD OF MANUFACTURE

This application is a non-provisional of U.S. provisional application 63/144,181 entitled Fascia Massager and Its Method of Manufacture filed Feb. 1, 2021, by same inventor Vince Costa, the disclosure of which is incorporated herein by reference.

FIELD OF THE INVENTION

The present invention is in the field of massagers and plastic injection molding.

DISCUSSION OF RELATED ART

A variety of different massagers have protrusions and protections simulate fingers. Black in U.S. Pat. No. 10,322,057, has spikes arranged on flowers which are attached to a bar or other device. The primary drawbacks are that the attachment concentrates the load of multiple fingers on a weak attachment point resulting in frequent structural failure. Another flaw is its multi piece construction which adds cost and complexity and there is no easy way it can be molded in a single press. Instead the device must be constructed from several pieces, resulting in increased cost and reduced reliability.

This inability to be manufactured by injection or other type of molding process in a very simple and inexpensive mold is indeed a fatal flaw in U.S. Pat. No. 10,322,057 and other prior art. Much of this complexity is due to the need to make handholds for the use of the device. Good holding ability is critical for ease of use in this type of tool, because during the use of the device oil or other lubricants are used on the skin making the tool very slippery to hold while applying proper pressure.

For example in U.S. Pat. D384,157, D447,809, D556,913 and D633,217 the massagers sacrifice the ability to form in simple mold in order to give the user some type of grip. Also, DeLuca in the U.S. Pat. No. 5,103,809 lacks an integrated grip, although it describes an external attachment. Similarly U.S. Pat. No. 1,713,756 has no finger grooves and thus is not suitable for this use without additional attachments. As seen from Goates in U.S. Pat. No. 965,564 there are no useable finger grips or contours.

SUMMARY OF THE INVENTION

The present invention is a fascia tissue fitness device and method of manufacture. This device has been specifically designed to act as a fascia tissue fitness device and also be manufactured complete in a single shot injection molding process without need for adding secondary components or assembly. An object of the present invention is to provide an ergonomically shaped fascia massager that conforms to the human hand while giving solid grip while simultaneously maintaining a shape that lends itself to rapid single press molding in plastic injection molding. The present invention also includes the method of manufacture with a suggested a plane and parting line through the part, such that the device tapers away as it gets further from the parting line. The present invention provides for a device specially adapted for fascia tissue massage. The present invention has a plurality of fingers formed as fingers which terminate in a rounded end that allows gentle fascia tissue massage. One more advantage of this device is its rugged construction. The preferred embodiment of the present invention utilizes injection molding, to maintain low cost high volume production. The top and bottom of the mold are separated by a single plane so as to allow simple injection molding. Additional objects of the invention are to allow the part to be made in a single shot mold, to provide finger holds at holes, to provide a body shape that allows holding, and to provide multiple fingers for pressure application.

A fascia massager has a main body which has a rounded a main body top portion and a flat lower portion on a main body bottom. Fingers are formed on the main body along the main body bottom. The fingers protrude downwardly from the main body bottom. The fingers have a conical finger taper. A first hexagonal frame and a second hexagonal frame are formed on the main body. The fingers extend downwardly as fingers having indents between the fingers. The fingers are parallel to each other. The indents are formed on sides of the main 55 body.

Preferably, the fingers terminate in a rounded end. The main body has two finger holes passing through the main body. The fingers have an axis generally perpendicular to the flat portion of the main body. The fingers have a taper in a direction that allows release from a lower mold during plastic injection molding. The fascia of the device has a parting line corresponding to the flat portion of the main body. The massager has a rounded a main body top portion above the parting line which releases from the upper mold. The fingers have finger tapers with rounded ends. The fingers begin at the parting line and extend downwardly as fingers having a rounded ends, which release from the lower mold during plastic injection molding.

The main body has finger holes passing through the main body. The finger holes have a finger hole taper for mold release. The indents on the main body are arc shaped indentations curving inwardly from each consecutive finger to form side grips. The indents are concave and vertically oriented such that they have an arc shape profile when viewed from a top or bottom view.

The lower mold has finger hole spacer upper tips that extend upwardly from the lower mold. The finger hole spacer upper tips are wedge-shaped and wedge into finger hole spacer indents which are also wedge shaped. The fascia massager is made by the step of having the finger hole spacer indents align the upper mold to the lower mold during plastic injection molding.

Figure 1:
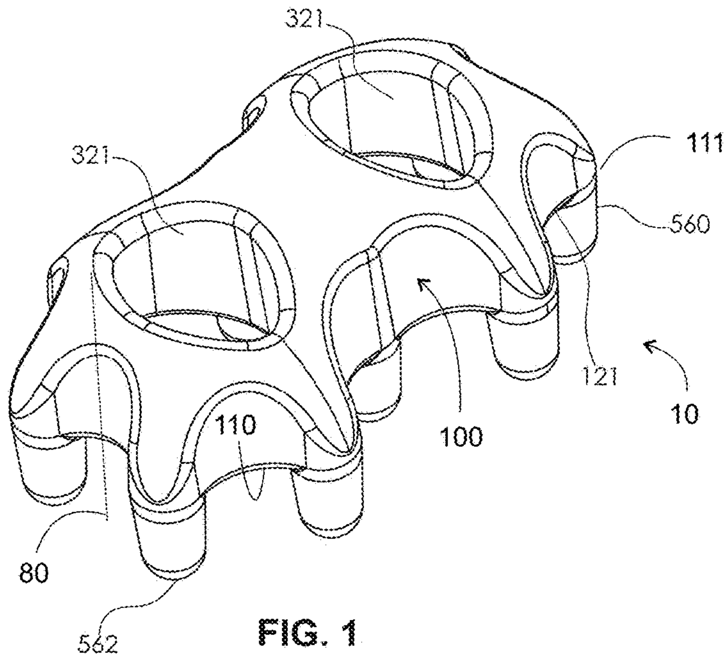
FIG. 1 is an perspective view of the present invention.
Figure 2:
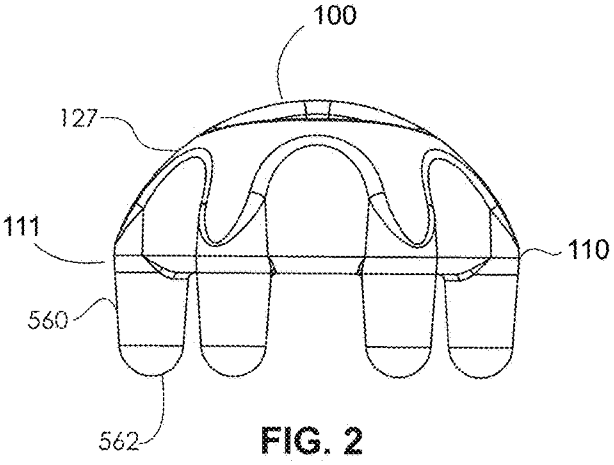
FIG. 2 is a front view.
Figure 3:
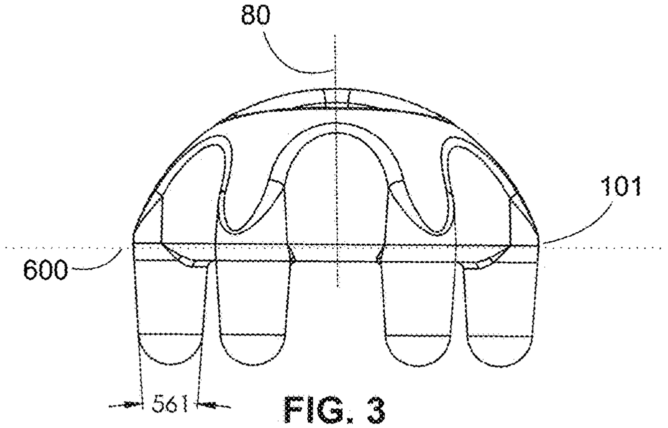
FIG. 3 is a back view.
Figure 4:
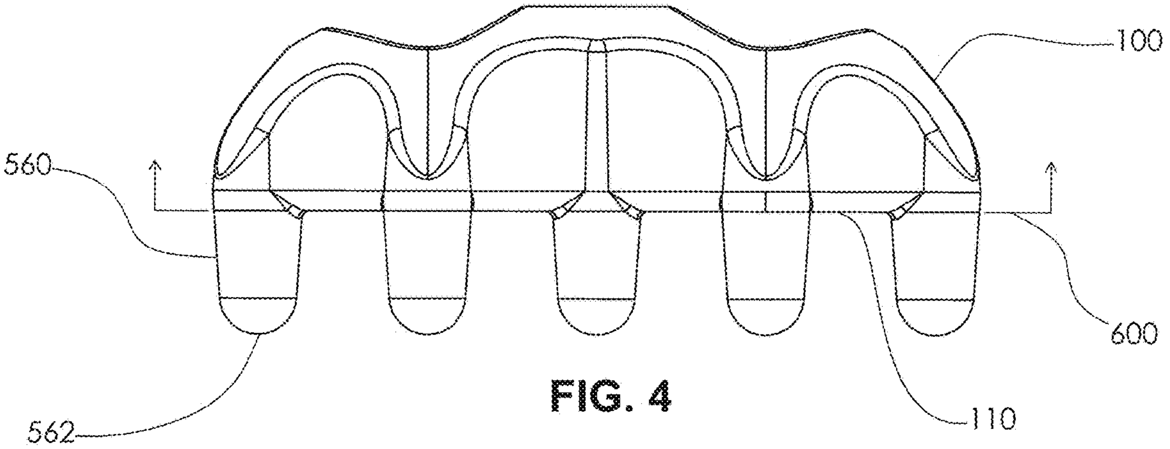
FIG. 4 is a right side view.
Figure 5:
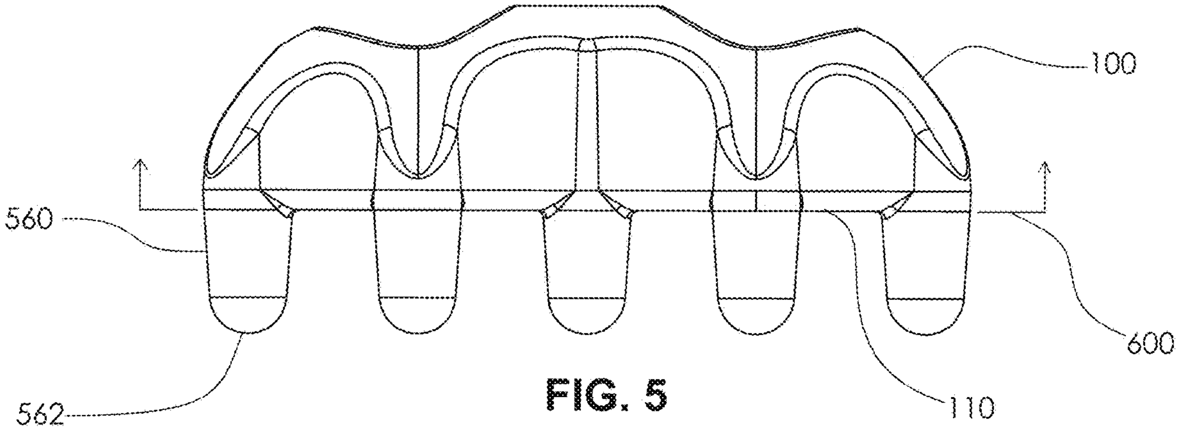
FIG. 5 is a left side view.

The following call out list of elements can be a useful guide to referencing the element numbers of the drawings.

10 Fascia Fitness Device
20 First Grip Opening
21 First Hexagonal Frame
30 Second Grip Opening
31 Second Hexagonal Frame

41 First Finger
42 Second Finger
43 Third Finger
44 Fourth Finger
45 Fifth Finger
46 Sixth Finger
47 Seventh Finger
48 Eighth Finger
49 Ninth Finger
50 Tenth Finger
61 First Indent
62 Second Indent
63 Third Indent
64 Fourth Indent
65 Fifth Indent
66 Sixth Indent
67 Seventh Indent
68 Eighth Indent
69 Ninth Indent
70 Tenth Indent
80 Arc Profile Orientation
101 Parting Plane
100 Main Body
102 Upper Portion
103 Lower Portion
110 Main Body Bottom
111 Flat Portion
121 Side Grips
127 Main Body Top
128 Main Body Bottom
270 Upper Mold
271 Upper Mold Cavity
280 Lower Mold
281 Lower Mold Spacer
282 Lower Mold Cavity
284 Finger Hole Spacer Indent
285 Finger Hole Spacer
286 Finger Hole Spacer Upper Tip
321 Finger Holes
560 Fingers
561 Finger Taper
562 Rounded End
600 Parting Line

DETAILED DESCRIPTION OF THE PREFERRED EMBODIMENT

As seen in FIGS. 1-8, the fascia fitness massager 10 has a main body 100 with a main body bottom 110 and a flat portion 111 below the main body bottom 110. Side grips 121 are formed on the periphery of the main body 100. The main body top 127 is rounded, and the main body bottom 128 conforms to a flat surface. Each of the fingers 560 has a finger taper 561 with a rounded end 562. The fingers begin at the horizontally oriented parting line 600 formed on the horizontally oriented parting plane 101. The fingers can extend downwardly as fingers having a rounded ends. Fingers can also be formed as spikes with tapered rounded points. Indents are formed between the fingers. The indents are hexagonally oriented around a set of hexagonally oriented fingers. The indents have a concave arc shaped vertical orientation. The arc shaped profile orientation 80 is shared among all of the ten indents. The indents and fingers are oriented at 120° angles from each other.

Figure 9:
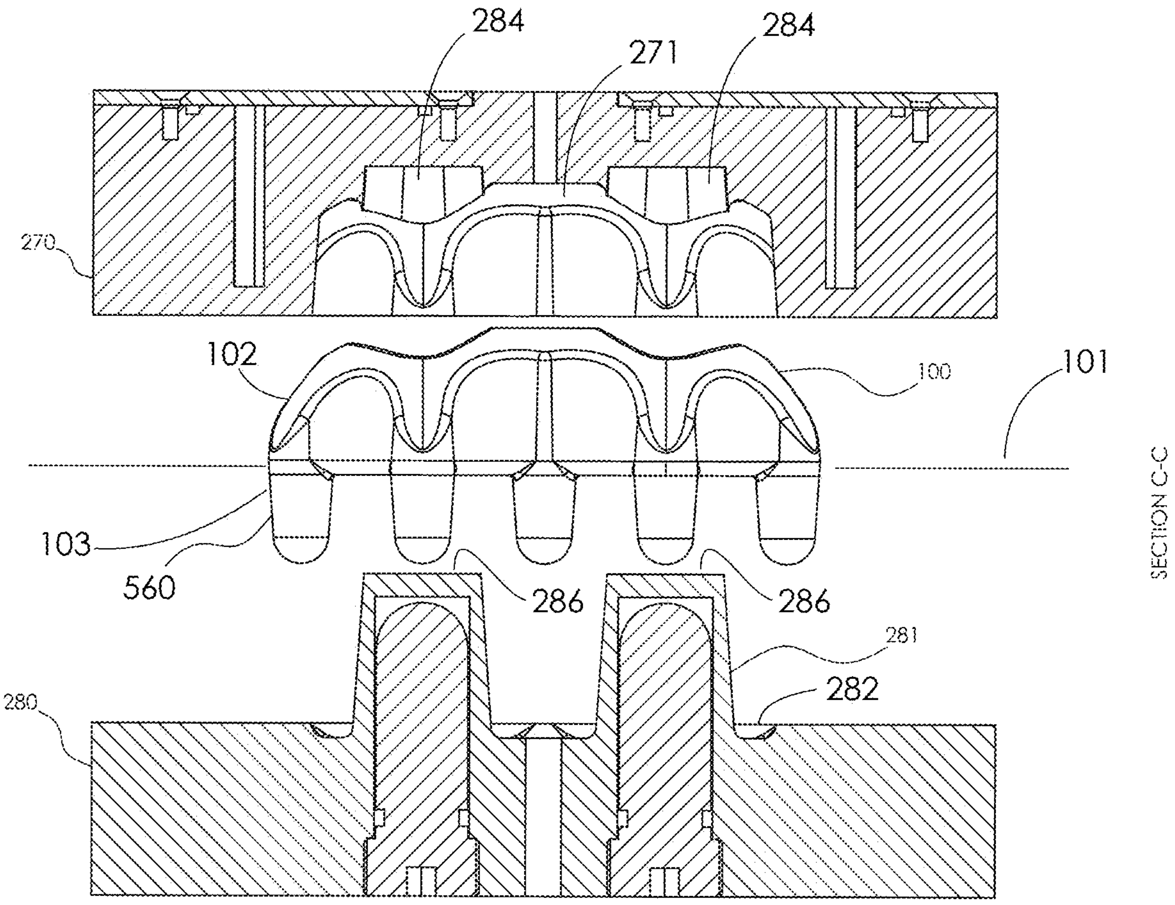
FIG. 9 is a right side view including mold halves.
Figure 10:
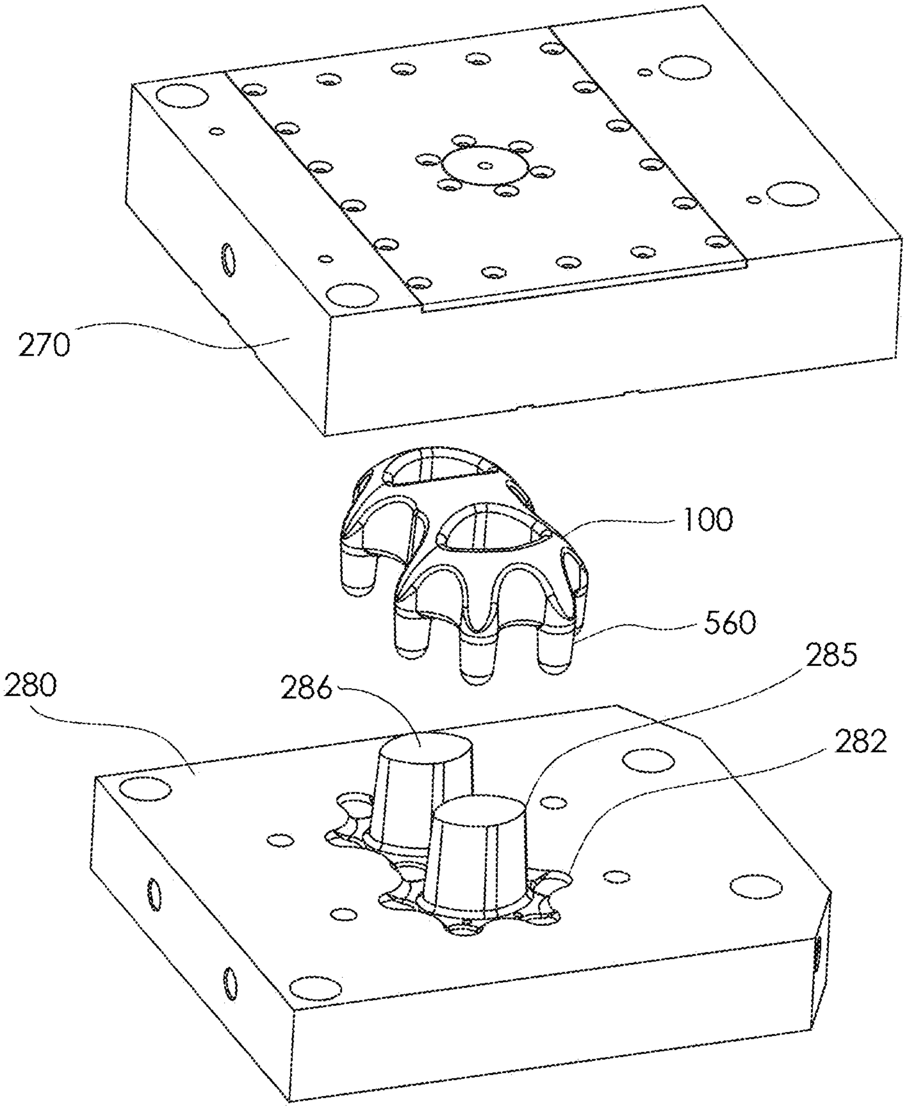
FIG. 10 is an upper perspective view of mold half and device.
Figure 11:
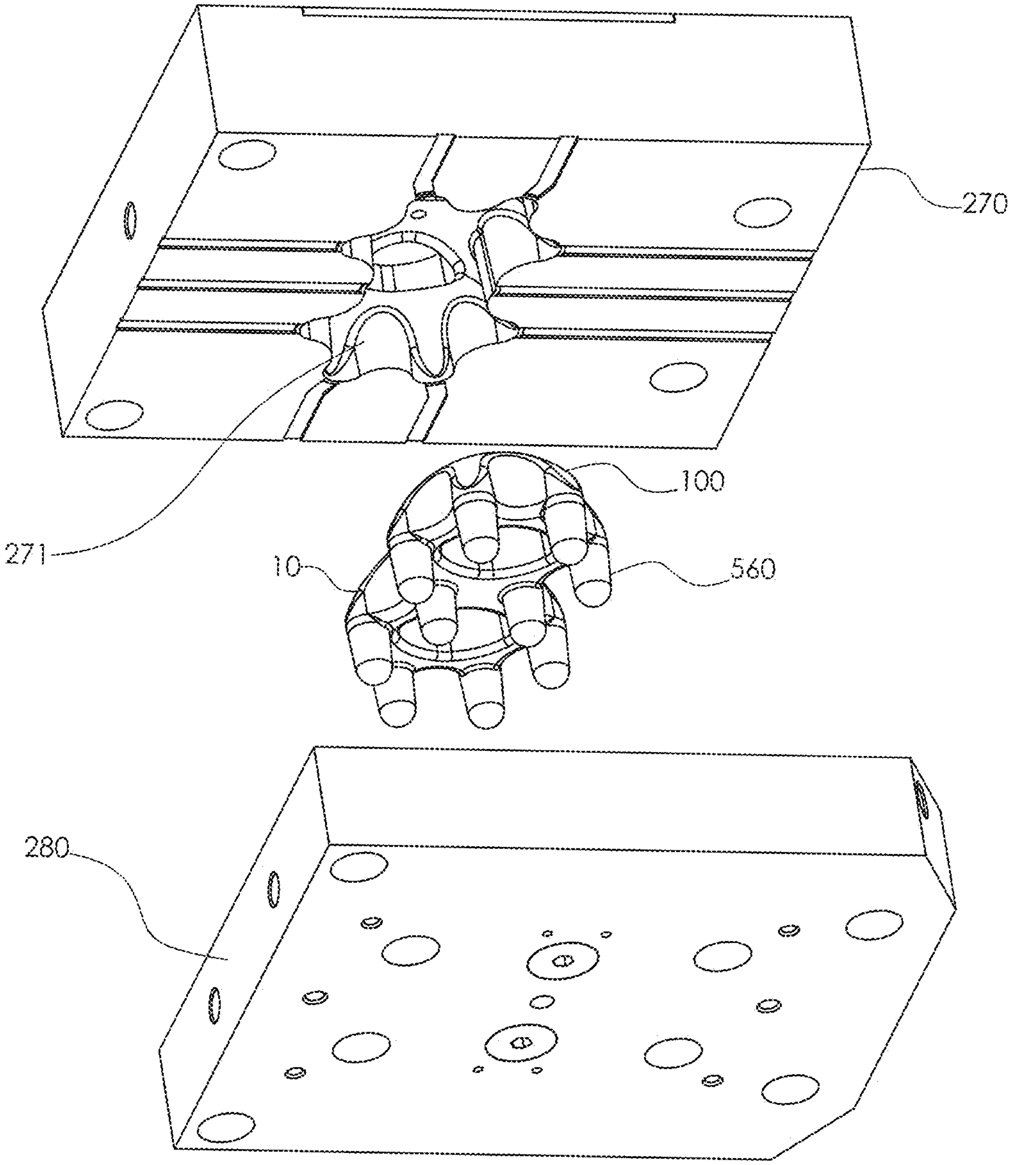
FIG. 11 is a lower perspective view of mold have and device.

As seen in FIGS. 9-11, the fascia fitness massager 10 is preferably made in a mold including an upper mold 270 having an upper mold cavity 271 which meets with a lower mold 280 having a lower mold cavity 282. The lower mold 280 has a lower mold spacer 281, and a finger hole spacer 285 extending upwardly through the first grip opening 20 and the second grip opening 30. The finger holes 321 are formed at the finger hole spacers 285. The finger hole spacers have finger hole spacer upper tips 286 that engage finger hole spacer indents 284. The finger hole spacer indents 284 are formed on the upper mold 270. The mold system has a parting line 600 and parting plane 101 between the lower mold and the upper mold.

The finger hole spacer upper tips 286 extend upwardly from the lower mold 280. The finger hole spacer upper tips 286 are wedge-shaped and wedge into the finger hole spacer indents 284 which are also wedge shaped. The finger hole spacer indents 284 having wedge shaped tapered sidewalls allow mold alignment between the upper mold 270 and the lower mold 280.

Figure 6:
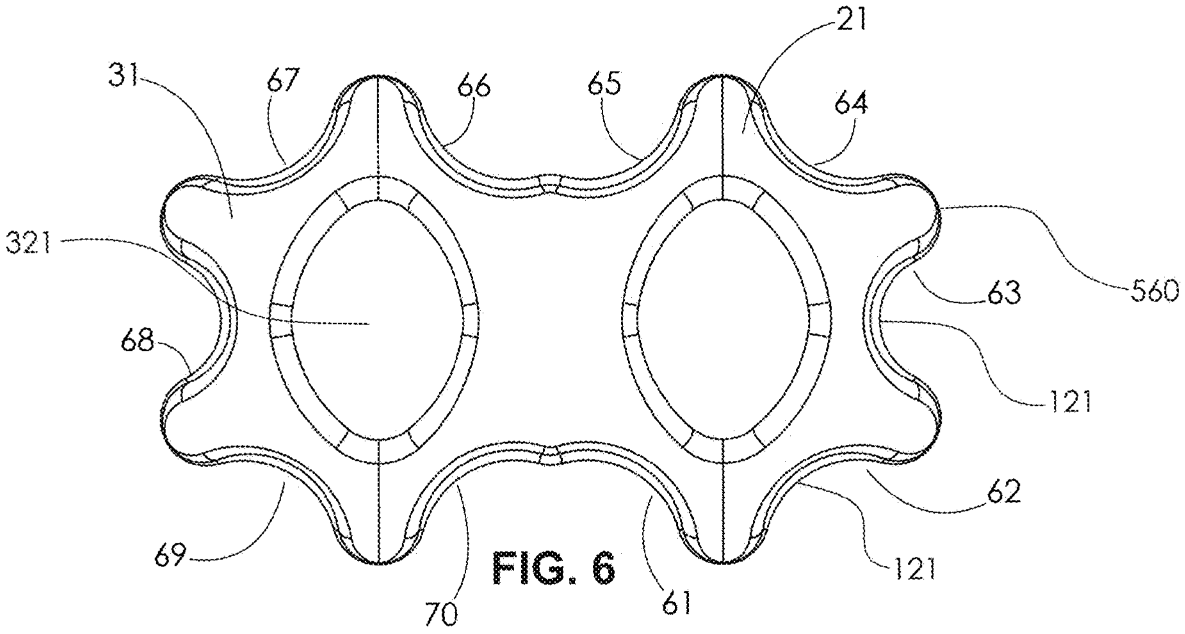
FIG. 6 is a top view.
Figure 7:
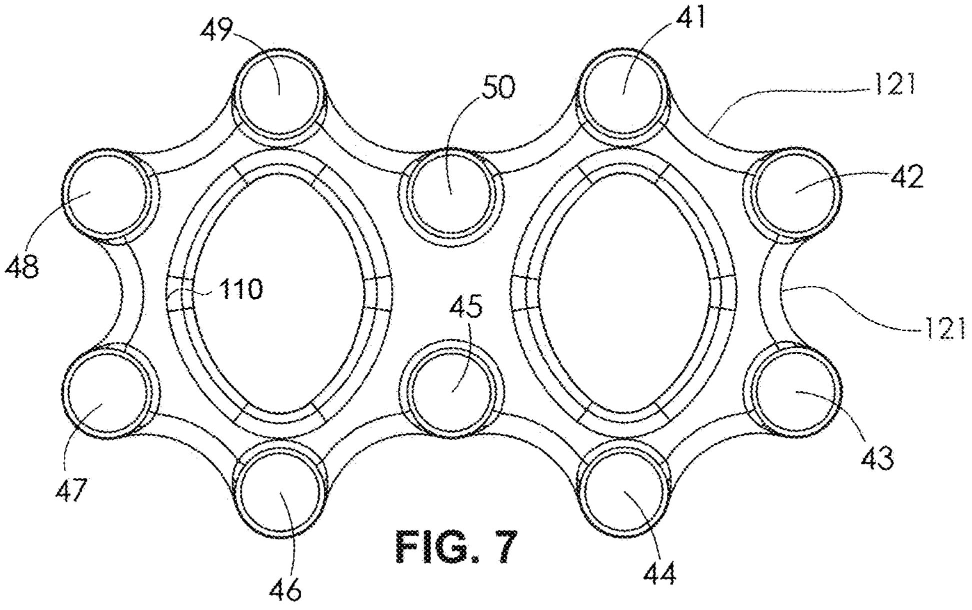
FIG. 7 is a bottom view.
Figure 8:
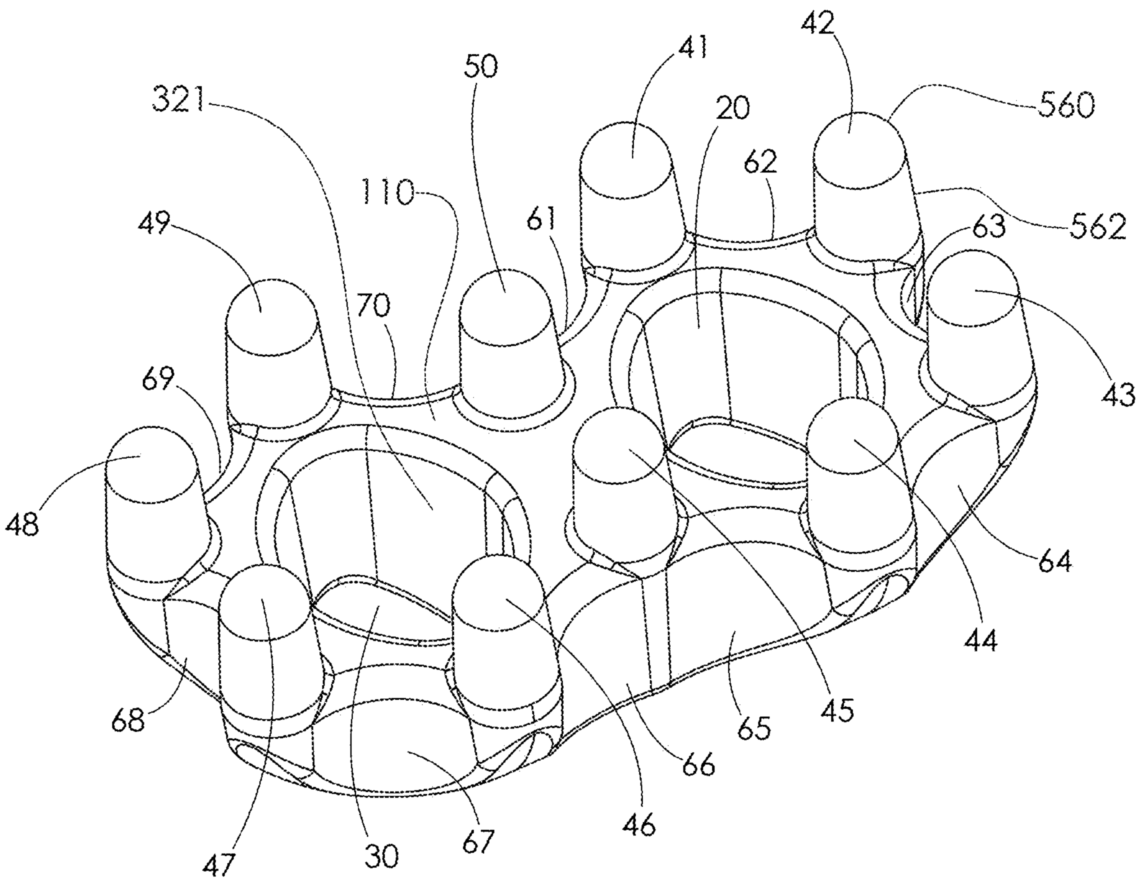
FIG. 8 is a bottom perspective view.

As seen in FIGS. 6-8, the first opening and second opening define a pair of hexagonal frames, namely the first hexagonal frame 21, and the second hexagonal frame 31. The pair of hexagonal frames have ten protruding fingers having fingers protruding from them. As seen in FIG. 8, the first grip opening 20 is bounded by a first finger 41, a second finger 42, a third finger 43, and a fourth finger 44. The first finger 41 opposes the fourth finger 44.

A first indent 61 is formed on the first hexagonal frame 21 between the first finger 41 and the tenth finger 50. A second indent 62 is formed on the first hexagonal frame 21 between the first finger 41 and the second finger 42. A third indent 63 is formed on the first hexagonal frame 21 between the second finger 42 and the third finger 43. A fourth indent 64 is formed on the first hexagonal frame 21 between the third finger 43, and the fourth finger 44. A fifth indent 65 is formed on the first hexagonal frame 21 between the fourth finger 44 and the fifth finger 45. A sixth indent 66 is formed on the second hexagonal frame 31 between the fifth finger 45 and the sixth finger 46. A seventh indent 67 is formed on the second hexagonal frame 31 between the sixth finger 46 and the seventh finger 47. An eighth indent 68 is formed on the second hexagonal frame 31 between the seventh finger 47 and the eighth finger 48. A ninth indent 69 is formed on the second hexagonal frame between the eighth finger 48 and the ninth finger 49. A tenth indent 70 is formed on the second hexagonal frame between the ninth finger 49 and the tenth finger 50.

The eighth indent 68 on the second hexagonal frame 31 opposes the third indent 63 on the first hexagonal frame 21. The fourth indent 64 opposes the ninth indent 69. The seventh indent 67 opposes the second indent 62. The tenth finger 50 opposes the fifth finger 45. The first grip opening and the second grip opening have oval profiles.

The foregoing description is of a preferred embodiment for implementing the invention, and the scope of the invention should not necessarily be limited by this description. The scope of the present invention is instead defined by the following claims.

The invention claimed is:

1. A fascia massager comprising:

a main body, wherein the main body has a rounded main body top portion and a flat lower portion on a main body bottom;

fingers formed on the main body along the main body bottom, wherein the fingers protrude downwardly from the main body bottom, wherein the fingers have a conical finger taper;

a first hexagonal frame and a second hexagonal frame formed on the main body, wherein indents are formed between the fingers, wherein the fingers are parallel to each other, wherein the indents are formed on sides of the main body namely:

a first indent formed on the first hexagonal frame between a first finger and a tenth finger;

a second indent formed on the first hexagonal frame between the first finger and a second finger;

a third indent formed on the first hexagonal frame between the second finger and a third finger;

a fourth indent formed on the first hexagonal frame between the third finger and a fourth finger;

a fifth indent formed on the first hexagonal frame between the fourth finger and a fifth finger;

a sixth indent formed on the second hexagonal frame between the fifth finger and a sixth finger;

a seventh indent formed on the second hexagonal frame between the sixth finger and a seventh finger;

an eighth indent formed on the second hexagonal frame between the seventh finger and an eighth finger;

a ninth indent formed on the second hexagonal frame between the eighth finger and a ninth finger; and a tenth indent formed on the second hexagonal frame between the ninth finger and the tenth finger;

wherein the main body has two finger holes passing through the main body.

2. The fascia massager of claim 1, wherein each of the fingers terminate in a rounded end.

3. The fascia massager of claim 1, wherein each of the fingers has an axis generally perpendicular to the flat lower portion of the main body; and wherein the conical finger taper extends in a direction that allows for release from a lower mold during plastic injection molding; and further including a parting line corresponding to the flat lower portion of the main body, with the rounded main body top portion above the parting line and configured to be released from an upper mold, wherein the fingers begin at the parting line and are configured to be released from the lower mold during plastic injection molding, wherein the parting line is horizontally oriented.

4. The fascia massager of claim 3, wherein the lower mold further includes finger hole spacer upper tips that extend upwardly from the lower mold, wherein the finger hole spacer upper tips are wedge-shaped and are configured to wedge into finger hole spacer indents which are also wedge shaped, wherein the fascia massager is configured to be made by aligning the upper mold and the lower mold via the finger hole spacer indents during plastic injection molding.

5. The fascia massager of claim 1, wherein the two finger holes each have a finger hole taper for mold release.

6. The fascia massager of claim 5, wherein the indents on the main body are arc shaped indentations curving inwardly from each consecutive finger to form side grips; and wherein the indents are concave and vertically oriented such that they have an arc shape profile when viewed from a top view or a bottom view.

* * * * *